May 20, 1952　　J. V. KERKHOFF　　2,597,498
X-RAY TUBE
Filed Dec. 10, 1948

INVENTOR.
JOSEPH V. KERKHOFF.
BY
ATTORNEY

Patented May 20, 1952

2,597,498

UNITED STATES PATENT OFFICE 2,597,498

X-RAY TUBE

Joseph V. Kerkhoff, South Fort Mitchell, Ky.

Application December 10, 1948, Serial No. 64,568

6 Claims. (Cl. 313—60)

1

This invention relates to improvements in Roentgen or X-ray tubes, and has to do more particularly with a bearing assembly for journalling a shaft on which two anodes are mounted for their synchronous drive, when the tube is connected to an alternating current-high tension for the production of Roentgen or X-rays. The two anodes are separated by a non-conductive spacer, thereby preventing any high voltage or potential being carried through from the anodes to the shaft or bearing.

One of the principal objects of the invention is mounting the anodes on the shaft with non-conductive connection between the anodes and the shaft.

Another object of the invention is mounting the anodes on the free end of a shaft and supporting the shaft in a single bearing assembly between the casing and the shaft.

Another object of the invention is in providing a device which is simple in construction and efficient in operation.

Other objects in construction and economies of operation will appear from the detailed description of a preferred device, embodying the invention.

For a better understanding of the invention, reference is made to the accompanying drawing, in which.

Figure 1:
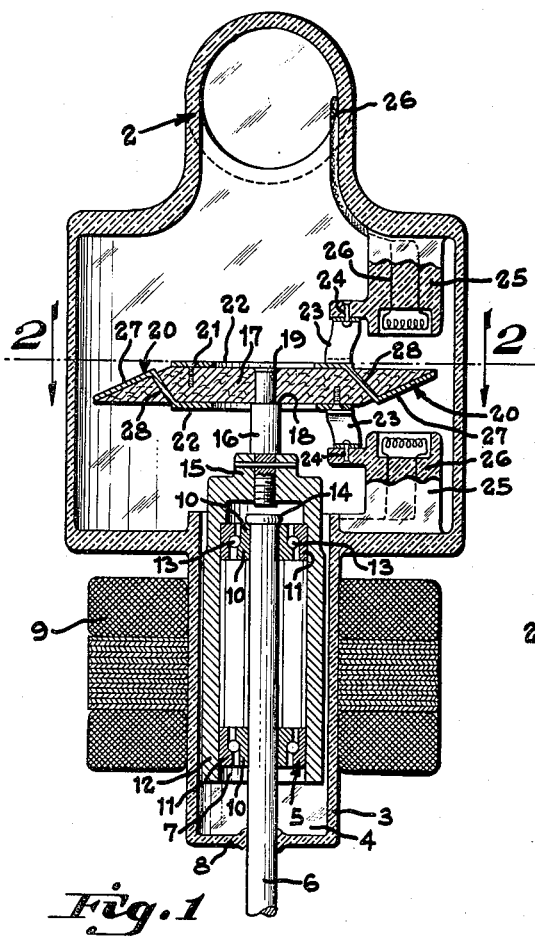
Fig. 1 is a longitudinal cross section through a device, embodying the invention.
Figure 2:
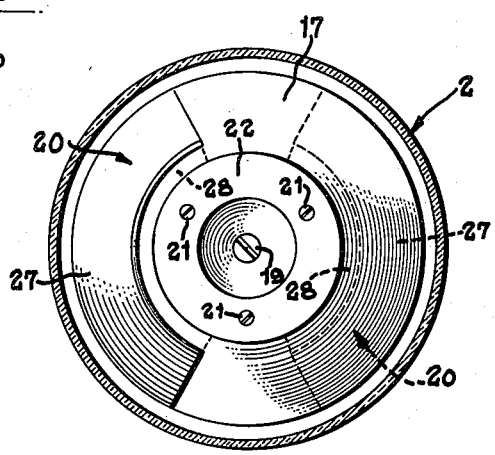
Fig. 2 is a cross sectional view on lines 2—2 of Fig. 1.
Figure 3:
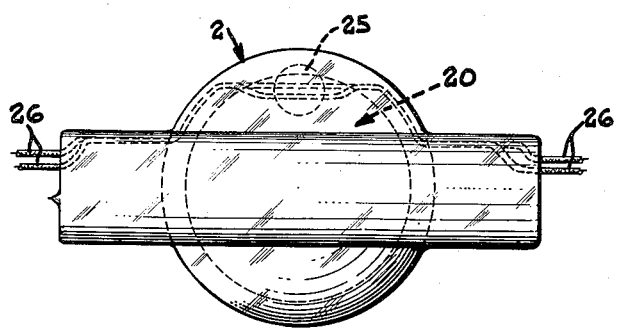
Fig. 3 is an end view of the device.

Referring specifically to the drawings in which like numerals are used to designate like parts, numeral 2 is a high vacuum casing which is formed from material such as glass. One end of the casing has a hub portion 3 with a chamber 4 therein in which a bearing denoted generally by numeral 5 is provided on a rod 6 that projects into one end of the casing through a recess 7. The portion 8 of the casing surrounding the rod and in contact therewith is sealed thereto by fusing this portion of the casing with said rod. A stator 9 of a motor is mounted on the exterior wall of the hub.

Inner race-ways 10, preferably two in number, are fixed on the rod, and respective outer race-ways 11 are fixed to the inner wall of sleeve 12. Balls 13 are placed between the inner and outer race-ways of each set. The free end of the rod may be provided with means, such as enlarged head 14, bearing against the end of the adjacent inner race-way. The sleeve has an open end to

2 permit the outer race-ways of the ball bearings being inserted therein. The opposite end of the sleeve provides a hub portion 15 to which one end of a stub shaft 16 may be attached.

A non-conductive spacer 17 is fixed to the opposite free end of the stub shaft, the end of the stub shaft being preferably of reduced diameter to project through the center of the spacer and provide the shoulder portion 18 against which the spacer abuts. The free end of the reduced portion of the stub shaft is enlarged at 19 to hold the spacer against the shoulder. This may advantageously be screw-threaded to the end of the stub shaft to clamp the spacer in place.

Two anode metal segments or sections 20 are attached to opposite sides or faces of the spacer by suitable fastening means, such as screws 21 which project through the anode sections or segments into the spacer. The anode segments or sections are diametrically opposite, and each includes an annular ring 22 whose face side contacts in slipping engagement with the stationary brushes or parts 23. In fact, it is the ring 22 through which the screws 21 project. There is a brush 23 on each side, each connected at 24 to an incandescent cathode 25. A cathode is coordinated to its respective anode with the anode voltage being fed to the cathode by a wire 26 from its high tension transformer (not shown). A pair of wires 26 lead from each cathode to two low tension transformers. There is a low tension transformer for each of the cathodes. A transformer to which the tube is connected is shown in Patent No. 2,350,642 and reference is made thereto for showing a transformer that is used with the tube.

The anode section has a face portion 27 disposed at an angle to the cathode so that it will be inclined. A web portion 28 connects the base of the anode section to the periphery of the annular ring 22, this being welded or otherwise attached to form an integral structure of the anode section and the ring.

In one half cycle of 180 degrees, the current flows first through one of the cathodes from its transformer to one of the anodes and one pole of the high tension transformer, and then in the next half cycle of 180 degrees the current flows through the other cathode from its transformer to the other anode and the other pole of the high tension transformer.

The anodes are mounted on a single shaft and both are insulated from said shaft, thereby preventing high voltage or potential being carried from either of the anodes to the shaft. A single bearing assembly is provided, and the sleeve, with the shaft 16 attached thereto, is driven by a single motor. Thus it will be readily apparent that the device is composed of a minimum of parts that are compactly arranged for efficient operation.

While I have described one preferred embodiment of the invention and its details of construction, it will be understood that there may be various changes in details of construction without departing from the spirit of the invention.

I claim:

1. An X-ray tube of the rotating anode type comprising a shaft, an anode mounted on said shaft, a non-conductive spacer between said shaft and anode, a contact ring connected to said anode, and a conducting brush in slipping engagement with said contact ring whereby high potential may be applied to said anode without passing through said shaft.

2. The X-ray tube of claim 1 having a plurality of anodes mounted on said shaft and insulated therefrom and from each other, and each of which anodes has a contact ring in slipping engagement with the conducting brush.

3. The X-ray tube of claim 2 in which the anodes are of substantially similar form and are oppositely disposed on said shaft.

4. The X-ray tube of claim 1 comprising a casing provided with a hub portion on one end, a motor stator surrounding the hub, a single bearing unit within the hub portion for rotatably supporting the shaft on which the anode is mounted.

5. The X-ray tube of claim 4 having a plurality of anodes mounted on said shaft and insulated therefrom and from each other, and each of which anodes has a contacting ring in slipping engagement with the contacting brush.

6. The X-ray tube of claim 5 in which the anodes are of substantially similar form and are oppositely disposed from said shaft.

JOSEPH V. KERKHOFF.

REFERENCES CITED

The following references are of record in the file of this patent:

UNITED STATES PATENTS

| Number | Name | Date |
|---|---|---|
| 2,121,632 | Gross et al. | June 21, 1938 |
| 2,274,865 | Machlett | Mar. 3, 1942 |
| 2,350,642 | Schwarzer | June 6, 1944 |